US010909514B2

(12) United States Patent
Hu

(10) Patent No.: US 10,909,514 B2
(45) Date of Patent: Feb. 2, 2021

(54) REAL-TIME GLOBAL FUND TRANSFERS

(71) Applicant: PAYPAL, INC., San Jose, CA (US)

(72) Inventor: Qilin Hu, Cupertino, CA (US)

(73) Assignee: Paypal, Inc., San Jose, CA (US)

(*) Notice: Subject to any disclaimer, the term of this patent is extended or adjusted under 35 U.S.C. 154(b) by 402 days.

(21) Appl. No.: 15/455,001

(22) Filed: Mar. 9, 2017

(65) Prior Publication Data

US 2017/0178098 A1    Jun. 22, 2017

Related U.S. Application Data

(63) Continuation of application No. 12/982,828, filed on Dec. 30, 2010, now abandoned.

(51) Int. Cl.
*G06Q 20/10* (2012.01)
*G06Q 40/02* (2012.01)

(52) U.S. Cl.
CPC ........... *G06Q 20/108* (2013.01); *G06Q 20/10* (2013.01); *G06Q 40/02* (2013.01)

(58) Field of Classification Search
CPC .................................................. G06Q 40/00
USPC .......................................................... 705/35
See application file for complete search history.

(56) References Cited

U.S. PATENT DOCUMENTS

| | | | |
|---|---|---|---|
| 5,778,178 A | 7/1998 | Arunachalam | |
| 7,617,114 B1 | 11/2009 | Tooke et al. | |
| 8,055,907 B2 | 11/2011 | Deem et al. | |
| 2001/0034682 A1* | 10/2001 | Knight | G06Q 40/06 705/35 |
| 2003/0163425 A1 | 8/2003 | Cannon | |
| 2003/0208440 A1 | 11/2003 | Harada et al. | |
| 2004/0148252 A1 | 7/2004 | Fleishman | |
| 2004/0236646 A1 | 11/2004 | Wu et al. | |
| 2005/0222957 A1 | 10/2005 | Understein | |

(Continued)

OTHER PUBLICATIONS

IEEE periodical publication : Banking in Cyberspace; an investment in itself. By M.C. McChesney ISSN 1939-9340 (Year: 1997).*

(Continued)

*Primary Examiner* — Bruce I Ebersman
*Assistant Examiner* — John A Anderson
(74) *Attorney, Agent, or Firm* — Haynes and Boone, LLP

(57) ABSTRACT

Systems, methods, and computer program products for providing a distributed instant fund transfer network are disclosed. For example, a computer-implemented method may include receiving, by a first server machine of a first financial institution, an instant fund transfer request from a user via a browser application, providing, by the first server machine, the instant fund transfer request to a second server machine of a financial services provider via a first application programming interface (API) chained by the financial services provider to a different API associated with a second financial institution, advancing, by the second server machine, funds from a cash account associated with the second financial institution regardless of whether transferred funds are received from the first financial institution, and providing, by the second server machine, instant fund transfer completion information to a third server machine of the second financial institution via the second API based on the chaining.

20 Claims, 4 Drawing Sheets

(56) References Cited

U.S. PATENT DOCUMENTS

| | | | |
|---|---|---|---|
| 2007/0050291 A1* | 3/2007 | Avazian | G06Q 20/10 |
| | | | 705/42 |
| 2007/0226139 A1* | 9/2007 | Crumbach | G06Q 40/00 |
| | | | 705/40 |
| 2009/0119190 A1* | 5/2009 | Realini | G06Q 20/10 |
| | | | 705/30 |
| 2009/0119209 A1 | 5/2009 | Sorenson et al. | |
| 2009/0150287 A1 | 6/2009 | Campbell et al. | |
| 2010/0325021 A1 | 12/2010 | Fasching | |
| 2011/0093397 A1 | 4/2011 | Carlson et al. | |
| 2011/0137791 A1* | 6/2011 | Zabawskyj | G06Q 40/00 |
| | | | 705/39 |

OTHER PUBLICATIONS

"Personal on-line payments," Kuttner, Kenneth N. et al., Economic Policy Review—Federal Reserve Bank of New York, 7(3), (Dec. 2001).

* cited by examiner

REAL-TIME GLOBAL FUND TRANSFERS

CROSS REFERENCE TO RELATED APPLICATION

The present application is a continuation of U.S. patent application Ser. No. 12/982,828, filed Dec. 30, 2010, which is hereby incorporated by reference in its entirety.

BACKGROUND

Technical Field

Embodiments of the present invention generally relate to methods and systems for facilitating financial transactions and, more particularly, to enabling a global network for providing instant bank fund transfers that is economical for low-value transactions.

Related Art

The International Standards Organization (ISO) is a worldwide federation of national standards bodies. The ISO International Standard ISO 20022, "Universal Financial Industry Message Scheme", is intended to provide the financial industry with a common platform for the development of messages in a standardized XML (Extensible Markup Language) syntax, using: 1) a modeling methodology (based on UML—Unified Modeling Language) to capture in a syntax-independent way financial business areas, business transactions and associated message flows; and 2) a set of XML design rules to convert the messages described in UML into XML schemas. This flexible framework allows communities of users and message development organizations to define message sets according to an internationally agreed approach and to migrate to the use of common XML-based syntax.

Society for Worldwide Interbank Financial Telecommunication (SWIFT) provides a global banking network (SWIFTNet) system for funds transfers between banks that is generally economical for individual users but requires a few business days, typically three, for the settlement of transactions, e.g., fund transfers, in which the recipient of funds may experience delay in the funds becoming available for use.

Real-time gross settlement systems (RTGS) are funds transfer systems where money is moved from one bank to another in "real-time" and on "gross" basis. Settlement in "real time" means the payment transaction is not subjected to any waiting period; the transactions are settled as soon as they are processed. Settlement on "gross" basis means each transaction is settled on a one-to-one basis without netting or grouping with any other transactions. In general, RTGS, typically used by companies, organizations, and institutions, is the fastest possible way to transfer money. Once processed, payments are final and irrevocable, but also require a significant fee from the user. RTGS systems may vary from country to country and is usually maintained and controlled by the Central Bank of a country. For example, Clearing House Automated Payments System (CHAPS) is used in the United Kingdom, while Fedwire is used in the United States. Compared, for example, to SWIFTNet, the RTGS system is suited for low-volume, high-value transactions, and thus may be prohibitively expensive for individual users.

SUMMARY

According to one or more embodiments of the present invention, methods and systems for real-time global bank funds transfers include a new payment system for real-time global bank fund transfers, a funds transfer network, and a method to allow global real-time fund transfers among banks. In one or more embodiments, a Financial Service Provider (FSP) has accounts or agreements with, for example, Bank A and Bank B. A first user with an account at Bank A makes a request for a fund transfer to a second user at Bank B. The request goes through the FSP, which can confirm the first user. If confirmed, the FSP sends funds to Bank B instantaneously, so that the second user receives the money right away. The first user does not "see" the FSP at all, but instead makes the payment through his own bank (e.g., Bank A) to another bank (e.g., Bank B). The FSP then waits the standard 3-5 days for money from Bank A (e.g., settlement of transaction).

In one or more embodiments, a system includes: a first cash account managed by a computer at a partner bank of a financial service provider (FSP) and owned by the FSP; a second cash account managed by a computer at the partner bank of the FSP and owned by a financial institution; and an application programming interface (API) for communication of financial transactions between the partner bank of the FSP and the financial institution so that instant funds transfer between the partner bank and the financial institution is accomplished via the API and internal transactions between the first cash account and the second cash account.

In another embodiment, a method includes: maintaining a first cash account, owned by a financial service provider (FSP), at a partner bank; maintaining a second cash account, owned by a financial institution, at the partner bank; invoking an application programming interface (API) for transfer of funds between the financial institution and the partner bank; and accomplishing instant funds transfer between the partner bank and the financial institution via the API and internal transactions in the partner bank between the first cash account and the second cash account.

In a further embodiment, a computer program product comprises a computer readable medium having computer readable and executable code for instructing a processor to perform a method that includes: maintaining a first cash account, owned by a financial service provider (FSP), at a partner bank; maintaining a second cash account, owned by a financial institution, at the partner bank; invoking an application programming interface (API) for transfer of funds between the financial institution and the partner bank; and accomplishing instant funds transfer between the partner bank and the financial institution via the API and internal transactions in the partner bank between the first cash account and the second cash account.

DETAILED DESCRIPTION

Embodiments of the present invention relate to providing a global network for instant transfer of funds between financial institutions that enables immediate, or "real-time", funds transfers between financial institutions (e.g., banks) regardless of whether the banks are in the same country or different countries. For brevity "bank" has been used for the more general term "financial institution" (FI) in the illustrative examples that follow, but no limitation of financial institutions only to banks is intended unless specifically stated. "Instant" means the payment transaction is not subjected to any waiting period; the transactions are settled as soon as they are processed, comparable to real-time settlement systems such as RTGS. Transactions conducted using the instant global funds transfer network according to one or more embodiments may be more economical for use by individuals than RTGS systems yet provide faster settlement than transactions that clear through SWIFTNet.

For example, the RTGS system is suited for low-volume (e.g., less than a hundred per day per institution), high-value (e.g., more than $10,000) transactions. RTGS systems are an alternative to systems of settling transactions at the end of the day, also known as net settlement systems, for example, Automated Clearing House (ACH) or SWIFTNet. In a net settlement system, all the inter-institution transactions during the day are accumulated. At the end of the day, the accounts of the institutions are adjusted.

A system according to one or more embodiments may be more convenient for users than a typical net settlement system. For example, transactions may be conducted on-line rather than the user having to walk up to a bank counter or teller window; the funds recipient may receive funds right away so that the user's transaction may be completed more quickly; and errors may be detected and corrected right away instead of taking perhaps as long as a week to correct, as in some conventional systems, during which time neither the user nor the recipient may have use of the money. For banks or financial institutions, the faster service provided by an embodiment may allow the bank to charge more for the faster service than for a conventional net settlement system funds transfer. Also, suitability for low-value funds transfers using an embodiment may lead to wider usage than that of RTGS, increasing volume of business for the bank providing the faster service.

Figure 1:
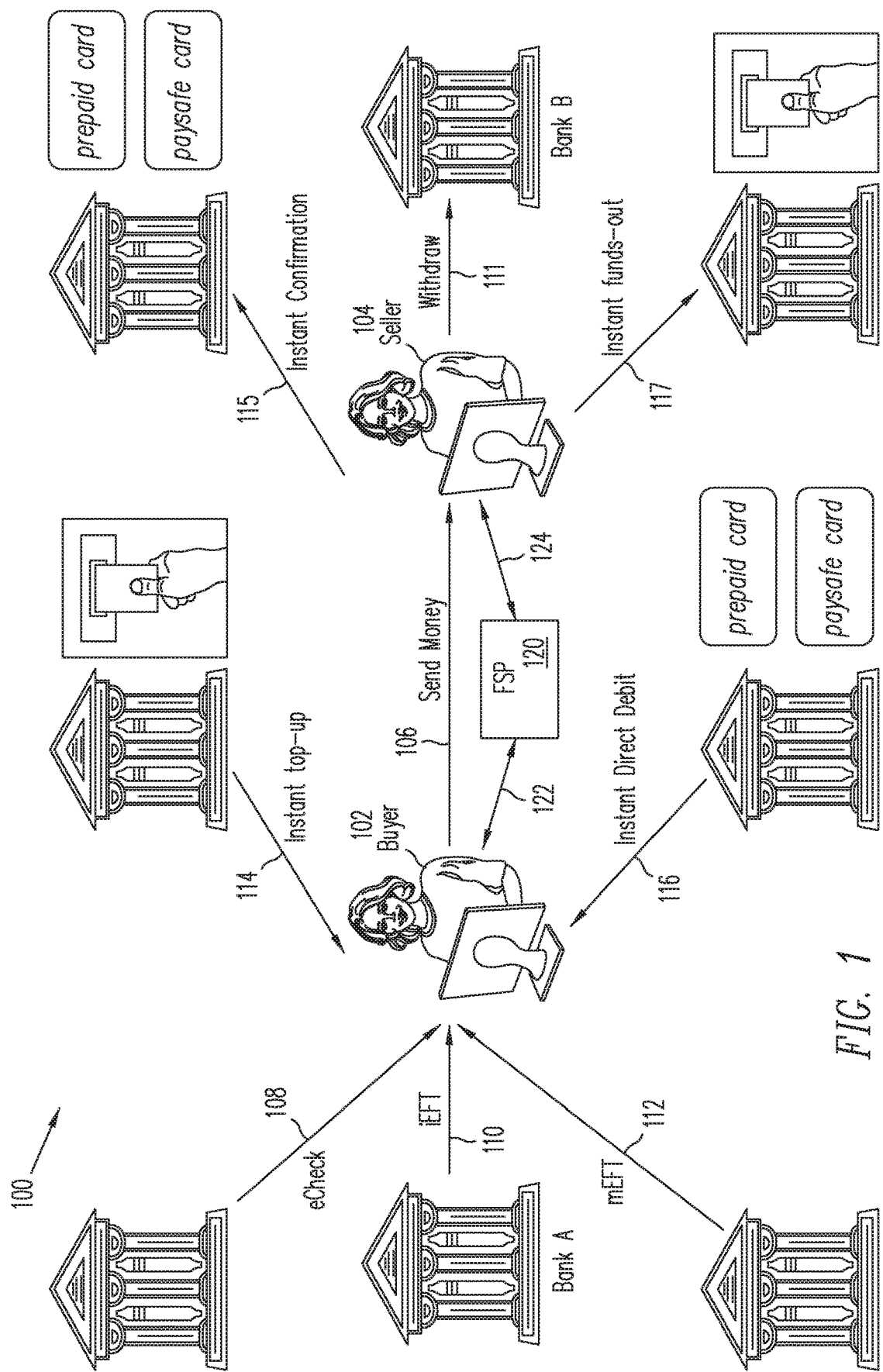
FIG. 1 is a system diagram illustrating a system for financial transactions in accordance with an embodiment of the present invention.

FIG. 1 illustrates a system 100, according to one embodiment, for facilitating financial transactions, e.g., transactions involving money in any of its various forms supported by system 100, in which a buyer 102 and seller 104 may wish to conduct a transaction 106, which may include sending money from buyer 102 to seller 104. Buyer 102 may be able to use any of several different mechanisms for sending money from an account at a bank (or other financial institution or financial service provider), for example, of the buyer 102 to seller 104 for accomplishing transaction 106. For example, buyer 102 may use an eCheck 108, an integrated electronic fund transfer (iEFT) 110, or a manual electronic funds transfer (mEFT) 112 to fund the transaction 106. Note that buyer and seller are used as an example, as any payer and payee may use features herein to effect instant money or fund transfers.

Using eCheck 108, buyer 102 may perform a credit/debit transaction that is similar to the use of a regular bank check, generally familiar to most people. Like a regular bank check, an eCheck 108 may be settled using the Automated Clearing House (ACH) network and may generally take 3 to 5 business days to clear, e.g., to be settled, meaning that the bank account of the recipient, also referred to as "creditor", e.g., seller 104, has been credited (recipient has full use of the money) and the bank account of the payer, also referred to as "debtor", e.g., buyer 102, has been debited (payer no longer has use of the money). With eCheck 108 the money may be paid to seller 104 from an account of buyer 102 by direct debit, which is a method of ACH collection in which the debtor, e.g., buyer 102, gives authorization to debit the account of buyer 102 upon the receipt of an entry issued by the creditor, e.g., seller 104.

A financial service provider (FSP) 120, such as PayPal, Inc. of San Jose, Calif., may provide a service (e.g., acting as an intermediary between buyer 102 and seller 104) that insulates buyer 102 from seller 104 by allowing completion of transaction 106 through the FSP 120 via transaction 122, between buyer 102 and FSP 120, and transaction 124, between seller 104 and FSP 120, as shown in FIG. 1. For example, FSP 120 may provide an eCheck 108 transaction in which buyer 102 sends money to FSP 120, and FSP 120 may then send the money to seller 104 via using a transaction 124 between FSP 120 and seller 104 that is agreeable to both parties. In this way, information need only pass between seller 104 and FSP 120 without seller 104 needing to know any financial information about buyer 102. Using this eCheck service, buyer 102 may give authorization to debit the account of buyer 102 upon the receipt of an entry issued by the FSP 120. The authorization may be enabled, for example, by buyer 102 providing the FSP 120 with appropriate information about the bank and account of buyer 102.

Returning to FIG. 1, using iEFT 110, buyer 102 may perform an integrated electronic fund transfer through the FSP 120. To use the iEFT service provided by FSP 120, buyer 102 may or may not provide the FSP 120 with appropriate information about the bank and account of buyer 102. Using this iEFT service, the buyer 102 may initiate the transaction 106 on a website of FSP 120 and the buyer 102 may be redirected to an on-line banking web page of the bank of buyer 102, Bank A. Buyer 102 may log on to Bank A at the on-line banking web page, and Bank A may provide buyer 102 the capability to confirm the payment and the amount. Once the buyer 102 confirms the payment and amount, the FSP 120 may receive instant payment verification, e.g., the payment is approved, authorization is completed, and it may be guaranteed to FSP 120 to receive payment within, for example, 2 to 3 days. At that time, because the money is deemed safe, FSP 120 may make immediate payment to the seller 104, e.g., release the funds or credit the funds to the seller 104.

Referring again to FIG. 1, using mEFT 112, buyer 102 may perform a manual electronic funds transfer through the FSP 120. To use the mEFT service provided by FSP 120, buyer 102 may or may not provide the FSP 120 with appropriate information about the bank and account of buyer 102. Using this mEFT service, the buyer 102 may provide FSP 120 with funds to be kept with FSP 120 in a user account of buyer 102. In effect, funds for the transaction 106 will be prepaid into an account with FSP 120 by the buyer 102. Having prepaid appropriate funds to FSP 120 (e.g., via transaction 122), buyer 102 may initiate the transaction 106 on a website of FSP 120. FSP 120 may then send the money to seller 104 using an appropriate method for accomplishing transaction 124. In this way, information need only pass between seller 104 and FSP 120 without seller 104 needing to know any financial information about buyer 102. With mEFT, as with iEFT, because the money is deemed safe, FSP 120 may make immediate payment to the seller 104, e.g., release the funds or credit the funds to the seller 104.

Returning again to FIG. 1, seller 104 may have several options for receiving the money sent by buyer 102 in transaction 106 from FSP 120 and putting the money into a bank account of seller 104. In one option, the seller 104 may maintain a seller account with FSP 120. Once the FSP 120 has provided the money from transaction 106 to the FSP seller account of seller 104, seller 104 may then withdraw the money (withdrawal 111) from the FSP seller account and, for example, deposit it with the bank of seller 104, Bank B.

FSP 120 may provide financial services that allow instant fund transfers, e.g., fund transfers in real time—such as those accomplished by RTGS systems—but adapted to low value transfers—such as those accomplished by SWIFTNet or ACH transfers. The instant fund transfers may, however, be provided more economically than by RTGS and more quickly than by SWIFTNet. Some of the financial services are illustrated in FIG. 1 as an instant top-up 114, an instant account confirmation (using withdrawals) 115, an instant direct debit 116, and an instant funds out (withdrawal) 117.

Figure 2:
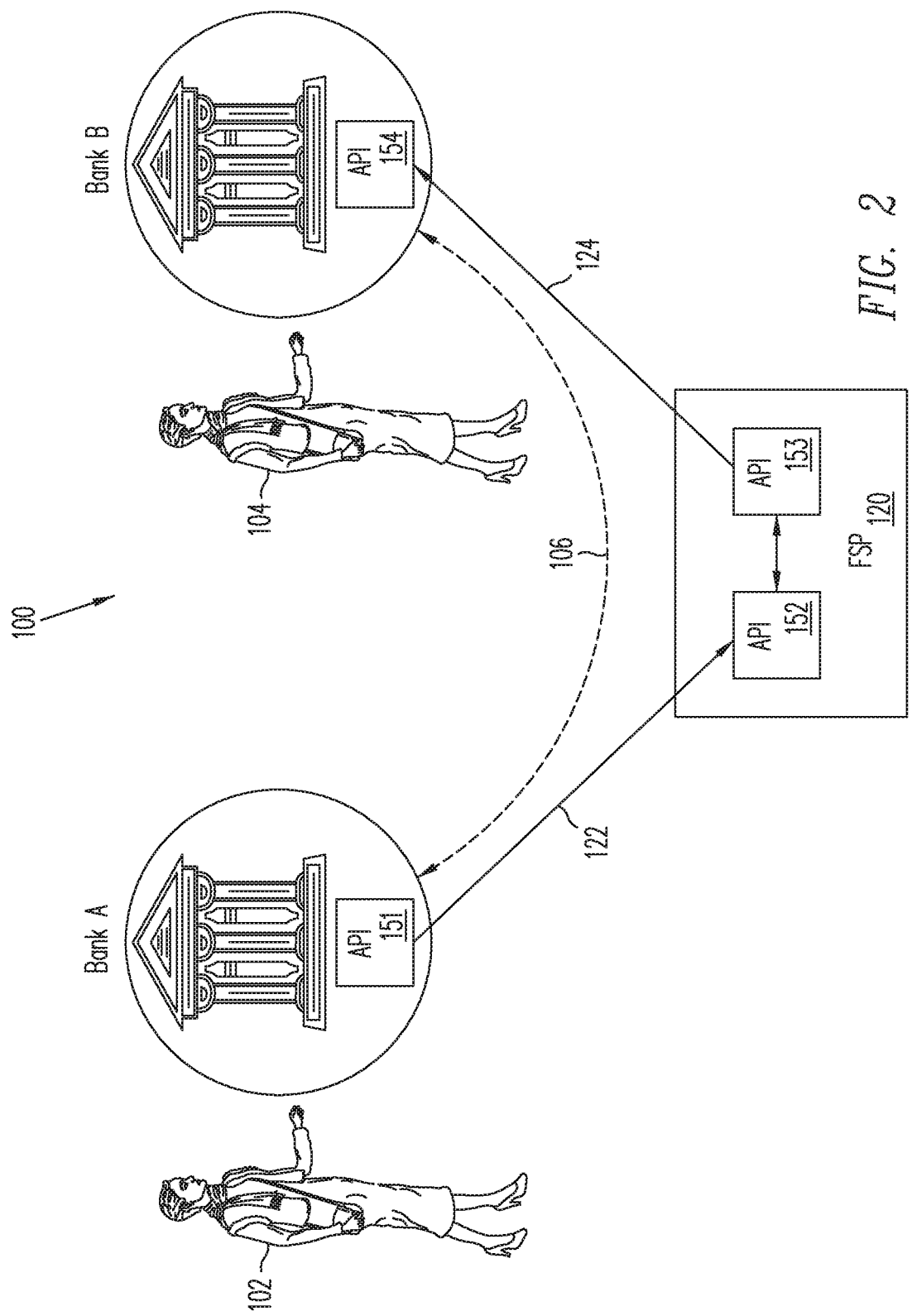
FIG. 2 is a system diagram illustrating a transaction in a system for financial transactions in accordance with an embodiment.

FIG. 2 illustrates a portion of system 100 for facilitating financial transactions according to one embodiment. Financial service provider 120 may provide system 100 as a bank-to-bank fund transfer network to which Bank A and Bank B belong, enabling instant or real-time transfer transaction 106 between Bank A and Bank B. The network of system 100 may be global, and Bank A and Bank B may be in the same or different countries. Transaction 106 may occur from a user (e.g. buyer 102 or ultimate debtor) of Bank A and a user (e.g., seller 104 or ultimate creditor) of Bank B, and in the case that user 104 is identical to user 102 it may be understood that user 102 is thus able to transfer money between his or her own accounts at different banks using system 100.

Bank A may offer interbank, instant funds transfers for banks in the network of system 100 as a product through on-line banking. A user (e.g., buyer 102 or ultimate debtor) having an account at Bank A may, for example, log on to an on-line banking web page of Bank A, and choose the global instant funds transfer service. The buyer 102 may then be presented, for example, with a drop down list of banks in the network of system 100 to which a transfer can be made. Upon the buyer 102 providing enough information (e.g., transfer amount, destination bank, destination account number, or seller 104 identification), Bank A may invoke an application programming interface (API) 151 to accomplish the transfer transaction 106. API 151, as well as APIs 152, 153, and 154, may be pre-defined such as ISO 20022 "FIToFICreditTransfer". API 151 may communicate with API 152 for performing transaction 122. Based on the information received by API 152 from Bank A, API 152 may chain to API 153 to communicate with API 154 at Bank B to perform transaction 124 so that transaction 106 between user 102 and user 104 may be completed. By chaining APIs in this manner, FSP 120 may form the network of system 100 and enable instant global interbank funds transfer via the network of system 100.

As seen in FIG. 2, transfer transaction 106 may be completed in several steps or links through FSP 120, which may be transparent to user 102 and user 104 as indicated by the dashed line representing transaction 106 in FIG. 2. In other words, user 102 may perceive that user 102 only needs to deal with Bank A in order to accomplish the entire transaction 106, without user 102 being aware of FSP 102 or partial transactions 122 and 124. On the other hand, Bank A may display, for example, on its on-line banking webpage that enables use of the funds transfer service, a trademark or logo of FSP 120 to indicate affiliation of the network of system 100 or the funds transfer service provided by Bank A with FSP 120. Such information may be displayed by Bank A for purposes of using the good will associated with the name of FSP 120 in encouraging trust of user 102 in system 100 and the funds transfer service provided by Bank A.

Figure 3:
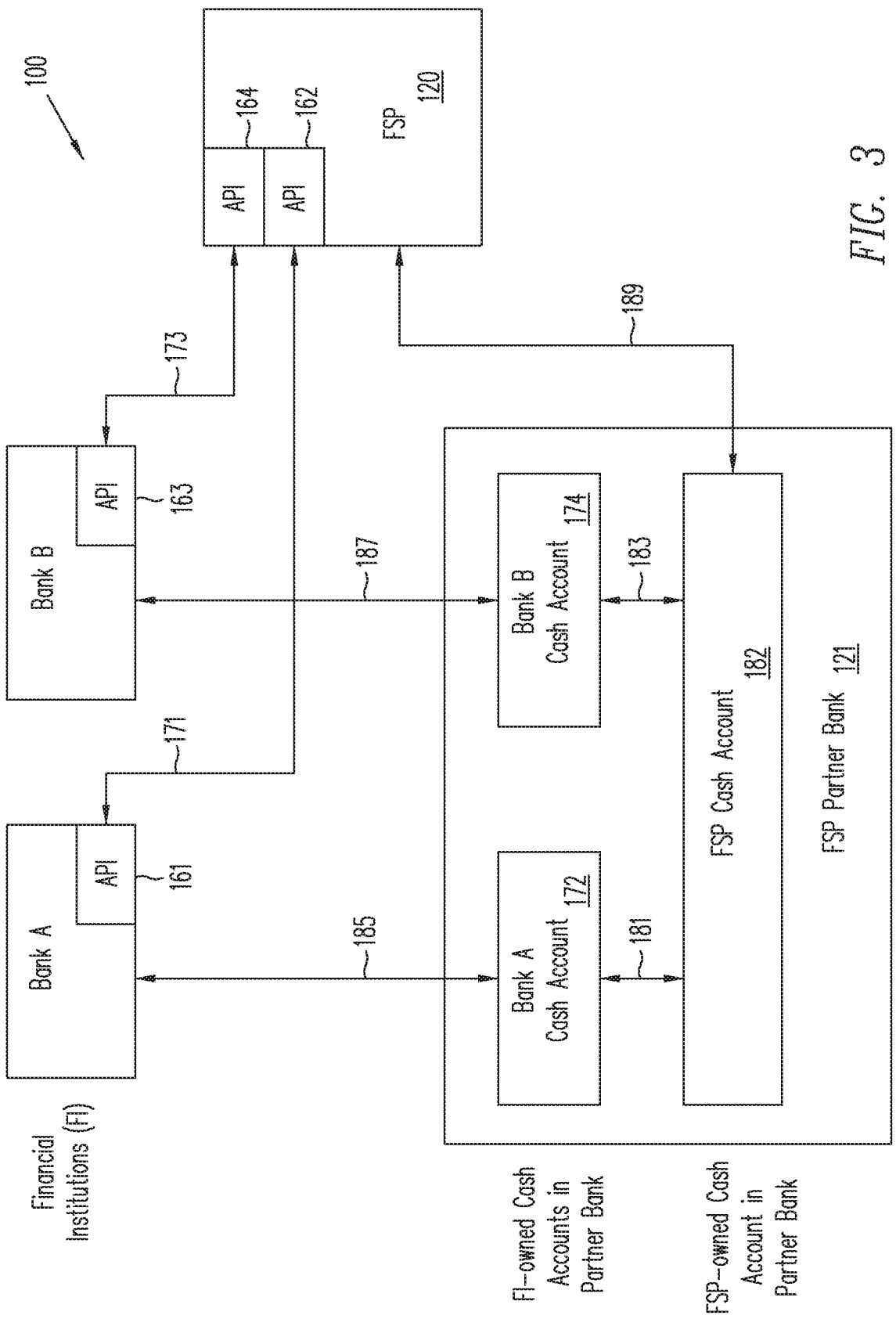
FIG. 3 is a system diagram illustrating operation of a system for financial transactions in accordance with an embodiment.

FIG. 3 illustrates an example of various operations of system 100 for financial transactions. In system 100, according to one or more embodiments, instant bank funds transfers can be made, on behalf of various users, between financial institutions, which in the example of FIG. 3 are illustrated by banks Bank A, Bank B, and a partner bank 121 of FSP 120. Users may be different users of the same or different banks, for example, or the same user may wish to transfer funds between that user's own accounts at different banks. As shown in FIG. 3, Bank A may be a bilateral bank, meaning there is an established bilateral relationship between Bank A and FSP partner bank 121. FSP partner bank 121 may provide a hosting service for cash accounts, e.g., business checking accounts, some of which are owned by banks in the system 100, e.g., Bank A cash account 172 owned by Bank A, and some of which are owned by FSP 120, e.g., FSP cash account 182.

For example, if a user of Bank A wishes to transfer money to a user of Bank B (e.g., transaction 106 shown in FIGS. 1 and 2), the Bank A user may so instruct Bank A and Bank A may begin a transaction 171 for transfer of funds using API 161 and API 162 to move funds (e.g., transfer 185) from the user's account at Bank A to Bank A's cash account 172 at FSP partner bank 121. FSP partner bank 121 may then make an internal transfer 181 of funds between Bank A's cash account 172 and FSP cash account 182. FSP partner bank 121 may use cash accounts 172, 174, and 182, by which multiple transactions—such as transfers 181, 183, and 185—are netted to maintain an aggregate balance for each cash account. The financial institutions in system 100, e.g., Bank A and FSP partner bank 121, may use a due to-due from accounting model for operating the network of system 100. Due to-due from accounts (as opposed, e.g., to transfer accounts) generally are similar to liability accounts in that they appear on the Balance Sheet of year-end statements and maintain a balance at the end of the year that is carried forward to the next year. This type of account is usually used for transferring money between companies. By way of contrast, transfer accounts generally are similar to expense accounts in that their balance is closed into the fund balance account at the end of the year and they appear on the Income Statement. This type of account is usually used for balancing transactions across funds.

Continuing the example (e.g., transaction 106 shown in FIGS. 1 and 2), subsequent to internal transfer 181, the funds transfer from the user of Bank A to the user of Bank B (which may be the same or a different user) may be completed via internal transfer 183 to Bank B's cash account 174 and transfer 187 (accomplished, e.g., via transaction 173) to the account of the user of Bank B at Bank B. Transaction 173 may be made using API 164 and API 163.

The overall transfer from the user of Bank A to the user of Bank B (e.g., transaction 106 shown in FIGS. 1 and 2) may be completed instantly because: 1) transfer 181 and transfer 183 are internal funds transfers of FSP partner bank 121, 2) transfer 185, occurring between Bank A and its own cash account 172 with FSP partner bank 121, may be accomplished by properly crediting and debiting the appropriate accounts via the use of API 161, API 162, and transaction 171, and 3) transfer 187 may be accomplished, like transfer 185, by properly crediting and debiting the appropriate accounts via the use of API 164, API 163, and transaction 173, without actual movement of funds between Bank B and its own cash account 174 at FSP partner bank 121.

To facilitate immediate settlement of transactions (e.g., transaction 106 shown in FIGS. 1 and 2), each financial institution (e.g., Bank A and Bank B) and the FSP 120 may take steps to ensure that each cash account in the FSP partner bank 121 maintains a large enough balance for settlement of a few days of transactions on a total aggregate basis. For example, FSP 120 may make funds transfers 189, and Bank A and Bank B may make funds transfers 185 and 187 respectively. Thus, at the end of each day, FSP 120 may issue fund transfer instructions to FSP partner bank 121; for example: "Today there is net $1,000,000.00 transaction payment amount from Bank A cash account to FSP cash account hosted by FSP partner bank". Because both cash accounts are hosted by the same bank, e.g., FSP partner bank 121, the instruction is satisfied by an intrabank account loop transfer. An intrabank loop transfer is instant. For example, error reporting can take place immediately, e.g., if any cash account has an insufficient balance. Thus, transactions, such as funds transfer transaction 106, may be settled immediately, e.g., do not take a number of business days to clear as with a conventional transfer made using, for example, SWIFTNet or ACH.

System 100 may be scalable in the sense that a new bank (or financial institution) may integrated into the system in practicably short amount of time so that the system can grow by hundreds to thousands of new financial institutions within a moderate time horizon, for example, 100 new banks within a year rather than 1 year for each new bank.

For example, integrating Bank B into system 100 may require setting up Bank B's cash account 174 to be hosted by FSP partner bank 121 for facilitating intrabank loop transfers 183. Open APIs, that is, APIs defined by ISO rather than the FSP 120—such as ISO 20022 APIs "FIToFI-CreditTransfer"—may be used so that not only the FSP 120 can implement and host appropriate APIs, but the new financial institution, e.g., Bank B for this example, can also invoke and host the appropriate APIs; thus, API invocation is bidirectional. With such an approach, integration of a new bank, e.g., Bank B, may require only configuring predefined APIs, e.g., configuring API 163 and API 164 for performance of transactions 173. Configuring the open APIs can save significant amount of product development time (e.g. up to about one year in each case) that would otherwise conventionally be required on the part of FSP 120 on a customized basis for each new financial institution.

Figure 4:
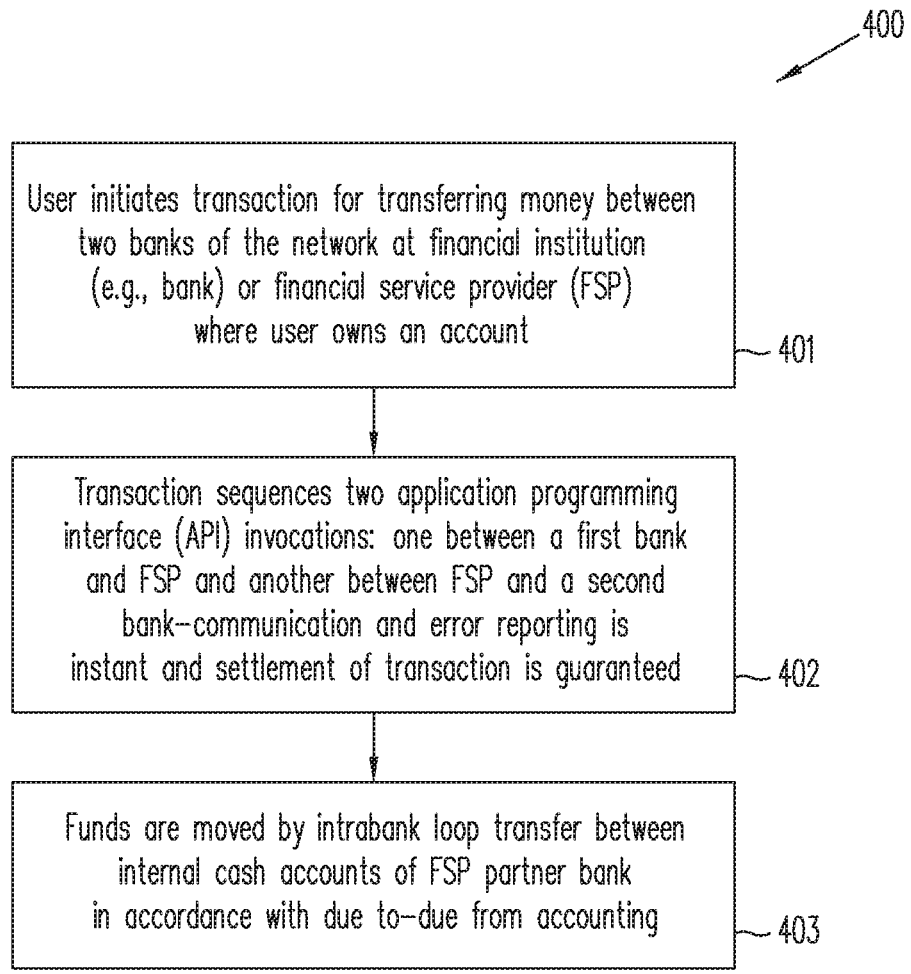
FIG. 4 is a flow chart illustrating a method for funds transfer in a system for financial transactions in accordance with an embodiment.

FIG. 4 illustrates a method 400 for transferring funds instantly in a global financial network such as system 100 according to one embodiment. At step 401, a user (e.g., buyer 102) may log in to the user's account at a financial institution (e.g., Bank A) using, for example, on-line banking provided by Bank A. For this example, the user may wish to move funds from an account with Bank A to an account at Bank B, so the transaction may be instant transfer of funds from the user's (e.g., buyer 102) account with Bank A to the account of a user (e.g., seller 104) at Bank B. The user may choose the transaction to perform at the on-line banking web page of Bank A and may provide additional choices and information—such as selecting Bank B from a drop down list of available banks that belong to the instant global funds transfer network of system 100. A bank may be available, for example, if the bank has been integrated into instant global funds transfer network of system 100 by FSP 120 and the bank has a cash account hosted by FSP partner bank 121, as shown in FIG. 3. At the end of the day, if the transaction is the only one for Bank A, that may be the only fund transfer issued to FSP partner bank 121 in that case; otherwise, several transactions may be netted against each other and an aggregate fund transfer issued to FSP partner bank 121 at the end of the day.

On day 1, in real-time, at step 402, FSP 120 may receive the credit transfer API invocation from Bank A to transfer $100 (in this example, to illustrate that some specific amount of funds is chosen by the user, $100 is used as the chosen amount) of the user's (e.g., buyer 102) account balance to an account at Bank B. Because the API provides instant results, the money movement settlement is guaranteed, e.g., reliance by FSP partner bank 121 on availability of funds in Bank A cash account 172 is safe. Using the information, FSP 120 may sequence the invocations of API 162 and API 164 to accomplish the complete transaction of transferring funds from Bank A to Bank B which may be described as chaining the transactions 171 and 173 or chaining the APIs for transactions 171 and 173. For example, FSP 120 having information from API 162 that transfer to Bank B is requested, may invoke API 164 and provide requisite information for completing the transfer of funds from Bank A to Bank B.

Upon receipt of the instructions via the API, at step 403, FSP partner bank 121 may use internal cash accounts (e.g., a general ledger account) which is hosted inside the instant global funds transfer network of system 100 (e.g., hosted by FSP partner bank 121) to credit the $100 to the cash account 174 of Bank B via transaction 181 and transaction 183 using, for example, intrabank loop transfers. Bank B may then transfer the money from its own cash account 174 to the account of the Bank B user (e.g., seller 104) at Bank B using, for example, funds transfer 187. Thus, money may be credited to the Bank B user's account at Bank B immediately (because money movement settlement is guaranteed) even though Bank B may wait the standard 3 to 5 days for settlement. Because Bank B can credit the funds immediately to the user's account with Bank B, Bank B may release the funds immediately for completion of a transaction desired by the user of Bank A (e.g., buyer 102). For example, Bank B may release funds immediately to seller 104, who then may process the order of buyer 102 and proceed immediately, for example, to ship goods to buyer 102.

In implementation of the various embodiments, embodiments of the invention may comprise a personal computing device, such as a personal computer, laptop, PDA, cellular phone or other personal computing or communication devices. The payment provider system may comprise a network computing device, such as a server or a plurality of servers, computers, or processors, combined to define a computer system or network to provide the payment services provided by a payment provider system.

In this regard, a computer system may include a bus or other communication mechanism for communicating information, which interconnects subsystems and components, such as processing component (e.g., processor, micro-controller, digital signal processor (DSP), etc.), system memory component (e.g., RAM), static storage component (e.g., ROM), disk drive component (e.g., magnetic or optical), network interface component (e.g., modem or Ethernet card), display component (e.g., CRT or LCD), input component (e.g., keyboard or keypad), and/or cursor control component (e.g., mouse or trackball). In one embodiment, disk drive component may comprise a database having one or more disk drive components.

The computer system may perform specific operations by processor and executing one or more sequences of one or more instructions contained in a system memory component. Such instructions may be read into the system memory component from another computer readable medium, such as static storage component or disk drive component. In other embodiments, hard-wired circuitry may be used in place of or in combination with software instructions to implement the invention.

Logic may be encoded in a computer readable and executable medium, which may refer to any medium that participates in providing instructions to the processor for execution. Such a medium may take many forms, including but not limited to, non-volatile media, volatile media, and transmission media. In one embodiment, the computer readable medium is non-transitory. In various implementations, non-volatile media includes optical or magnetic disks, such as disk drive component, volatile media includes dynamic memory, such as system memory component, and transmission media includes coaxial cables, copper wire, and fiber optics, including wires that comprise bus. In one example, transmission media may take the form of acoustic or light waves, such as those generated during radio wave and infrared data communications.

Some common forms of computer readable and executable media include, for example, floppy disk, flexible disk, hard disk, magnetic tape, any other magnetic medium, CD-ROM, any other optical medium, punch cards, paper tape, any other physical medium with patterns of holes, RAM, ROM, EPROM, FLASH-EPROM, any other memory chip or cartridge, carrier wave, or any other medium from which a computer is adapted.

In various embodiments, execution of instruction sequences for practicing the invention may be performed by a computer system. In various other embodiments, a plurality of computer systems coupled by communication link (e.g., LAN, WLAN, PTSN, or various other wired or wireless networks) may perform instruction sequences to practice the invention in coordination with one another.

Computer system may transmit and receive messages, data, information and instructions, including one or more programs (i.e., application code) through communication link and communication interface. Received program code may be executed by processor as received and/or stored in disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable and executable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Having thus described various example embodiments of the disclosure, persons of ordinary skill in the art will recognize that changes may be made in form and detail without departing from the scope of the invention. Thus, the invention is limited only by the claims.

What is claimed is:

1. A server machine in a distributed instant fund transfer network, comprising:
a non-transitory memory storing instructions; and
one or more hardware processors coupled to the non-transitory memory and configured to read the instructions from the non-transitory memory to cause the server machine to perform operations comprising:
executing a first bidirectional application programming interface (API) associated with a second server machine of a first financial institution, wherein the first bidirectional API is configured to receive an instant fund transfer request from the second server machine in response to an initiation of the instant fund transfer request from a first computing device of a first user;
executing a second bidirectional API associated with a third server machine of a second financial institution, wherein the second bidirectional API is configured to provide fund transfer completion information to the third server machine and cause a delivery of the fund transfer completion information to a second browser application running on a second computing device of a second user, and wherein the first bidirectional API and the second bidirectional API are different APIs,
wherein the first bidirectional API is compatible with a first data format standard associated with a first country, and wherein the second bidirectional API is compatible with a second data format standard associated with a second country;
chaining the first bidirectional API with the second bidirectional API, wherein the chaining allows a completion of the instant fund transfer request using the first bidirectional API and the second bidirectional API;
responsive to receiving the instant fund transfer request from the second server machine via the first bidirectional API:
obtaining a balance of a first account of the first financial institution stored on one or more server machines of a partner bank of the server machine and a balance of a financial services provider (FSP) cash account stored on the one or more server machines of the partner bank;
determining that the balance of the first account of the first financial institution stored on the one or more server machines of the partner bank of the server machine exceeds a required balance to fulfill the instant fund transfer request;
responsive to the determining that the balance of the first account of the first financial institution stored on the one or more server machines of the partner bank of the server machine exceeds the required balance to fulfill the instant fund transfer request, completing a first loop transfer from the first account of the first financial institution stored on the one or more server machines of the partner bank to the FSP cash account stored on the one or more server machines of the partner bank; and completing a second loop transfer from the FSP cash account stored on the one or more server machines of the partner bank to a second account of the second financial institution stored on the one or more server machines of the partner bank;

responsive to the completing of the first loop transfer and the completing of the second loop transfer, causing the third server machine, via the second bidirectional API, to advance funds from an internal cash account of the second financial institution stored on the third server machine to a recipient account stored on the third server machine of the second financial institution, wherein:

the advancement of funds is made prior to the funds being received by the internal cash account of the second financial institution from the first financial institution, the first account of the first financial institution stored on the one or more server machines of the partner bank, the FSP cash account stored on the one or more server machines of the partner bank, and the second account of the second financial institution stored on the one or more server machines of the partner bank; and the advancement of funds from the internal cash account of the second financial institution to the recipient account is made in real-time relative to receiving the instant fund transfer request from the first computing device of the first user; and subsequent to the causing the third server machine to advance the funds, providing fund transfer completion information to the second bidirectional API based on the chaining, wherein the fund transfer completion information indicates that the instant fund transfer request has been fulfilled.

2. The server machine of claim 1, wherein the chaining comprises chaining the first bidirectional API to the second bidirectional API via a third API.

3. The server machine of claim 1, wherein the initiation of the instant fund transfer request does not redirect the first user away from an online site from which the instant fund transfer request was initiated.

4. The server machine of claim 1, wherein at least one of the first bidirectional API or the second bidirectional API are configured according to an ISO 20022 standard.

5. The server machine of claim 1, wherein the second bidirectional API is used in providing the fund transfer completion information to the second user at an online site of the second financial institution without redirecting the second user away from the online site.

6. The server machine of claim 1, wherein the first account and the second account are maintained based on "due to-due from" accounting.

7. The server machine of claim 1, wherein the chaining comprises:

sequencing invocations of the first bidirectional API and the second bidirectional API.

8. A machine-implemented method for processing an instant fund transfer across a distributed instant fund transfer network, comprising:

executing, by a server machine, a first bidirectional application programming interface (API) associated with a second server machine of a first financial institution, wherein the first bidirectional API is configured to receive an instant fund transfer request from the second server machine in response to an initiation of the instant fund transfer request from a first computing device of a first user;

executing, by the server machine, a second bidirectional API associated with a third server machine of a second financial institution, wherein the second bidirectional API is configured to provide fund transfer completion information to the third server machine and cause a delivery of the fund transfer completion information to a second browser application running on a second computing device of a second user, and wherein the first bidirectional API and the second bidirectional API are different APIs, wherein the first bidirectional API is compatible with a first data format standard associated with a first country, and wherein the second bidirectional API is compatible with a second data format standard associated with a second country;

chaining, by the server machine, the first bidirectional API with the second bidirectional API, wherein the chaining allows a completion of the instant fund transfer request using the first bidirectional API and the second bidirectional API;

responsive to receiving the instant fund transfer request from the second server machine via the first bidirectional API:

obtaining, by the server machine, a balance of a first account of the first financial institution stored on one or more server machines of a partner bank of the server machine and a balance of a financial services provider (FSP) cash account stored on the one or more server machines of the partner bank;

determining, by the server machine, that the balance of the first account of the first financial institution stored on the one or more server machines of the partner bank of the server machine exceeds a required balance to fulfill the instant fund transfer request;

responsive to the determining that the balance of the first account of the first financial institution stored on the one or more server machines of the partner bank of the server machine exceeds the required balance to fulfill the instant fund transfer request, completing, by the server machine, a first loop transfer from the first account of the first financial institution stored on the one or more server machines of the partner bank to the FSP cash account stored on the one or more server machines of the partner bank; and completing, by the server machine, a second loop transfer from the FSP cash account stored on the one or more server machines of the partner bank to a second account of the second financial institution stored on the one or more server machines of the partner bank;

responsive to the completing of the first loop transfer and the completing of the second loop transfer, causing the third server machine, by the server machine via the second bidirectional API, to advance funds from an internal cash account of the second financial institution stored on the third server machine to a recipient account stored on the third server machine of the second financial institution, wherein:

the advancement of funds is made prior to the funds being received by the internal cash account of the second financial institution from the first financial institution, the first account of the first financial institution stored on the one or more server machines of the partner bank, the FSP cash account stored on the one or more server machines of the partner bank, and the second account of the second financial institution stored on the one or more server machines of the partner bank; and the advancement of funds from the internal cash account of the second financial institution to the recipient account is made in real-time relative to receiving the instant fund transfer request from the first computing device of the first user; and subsequent to the causing the third server machine to advance the funds, providing, by the server machine, fund transfer completion information to the second bidirectional API based on the chaining, wherein the fund transfer completion information indicates that the instant fund transfer request has been fulfilled.

9. The machine-implemented method of claim 8, wherein the first bidirectional API is chained to the second bidirectional API via a third bidirectional API.

10. The machine-implemented method of claim 8, wherein the instant fund transfer request does not redirect the first user to a different website in the second browser application running on the first computing device.

11. The machine-implemented method of claim 8, wherein at least one of the first bidirectional API or the second bidirectional API are configured according to an ISO 20022 standard.

12. The machine-implemented method of claim 8, wherein the second bidirectional API is used in providing the fund transfer completion information to the second user at a website of the second financial institution without redirecting the second user away from the website.

13. The machine-implemented method of claim 8, further comprising:
maintaining the first account and the second account based on "due to-due from" accounting.

14. The machine-implemented method of claim 8, wherein the first bidirectional API chained to the second bidirectional API causes an invocation of the second bidirectional API in sequence with an invocation of the first bidirectional API.

15. A non-transitory machine-readable medium having stored thereon machine-readable instructions executable to cause a server machine to perform operations comprising:

executing a first bidirectional application programming interface (API) associated with a second server machine of a first financial institution, wherein the first bidirectional API is configured to receive an instant fund transfer request from the second server machine in response to an initiation of the instant fund transfer request from a first computing device of a first user;

executing a second bidirectional API associated with a third server machine of a second financial institution, wherein the second bidirectional API is configured to provide fund transfer completion information to the third server machine and cause a delivery of the fund transfer completion information to a second browser application running on a second computing device of a second user, and wherein the first bidirectional API and the second bidirectional API are different APIs, wherein the first bidirectional API is compatible with a first data format standard associated with a first country, and wherein the second bidirectional API is compatible with a second data format standard associated with a second country;

chaining the first bidirectional API with the second bidirectional API, wherein the chaining allows a completion of the instant fund transfer request using the first bidirectional API and the second bidirectional API;

responsive to receiving the instant fund transfer request from the second server machine via the first bidirectional API:

obtaining a balance of a first account of the first financial institution stored on one or more server machines of a partner bank of the server machine and a balance of a financial services provider (FSP) cash account stored on the one or more server machines of the partner bank;

determining that the balance of the first account of the first financial institution stored on the one or more server machines of the partner bank of the server machine exceeds a required balance to fulfill the instant fund transfer request;

responsive to the determining that the balance of the first account of the first financial institution stored on the one or more server machines of the partner bank of the server machine exceeds the required balance to fulfill the instant fund transfer request, completing a first loop transfer from the first account of the first financial institution stored on the one or more server machines of the partner bank to the FSP cash account stored on the one or more server machines of the partner bank; and completing a second loop transfer from the FSP cash account stored on the one or more server machines of the partner bank to a second account of the second financial institution stored on the one or more server machines of the partner bank;

responsive to the completing of the first loop transfer and the completing of the second loop transfer, causing the third server machine, via the second bidirectional API, to advance funds from an internal cash account of the second financial institution stored on the third server machine to a recipient account stored on the third server machine of the second financial institution, wherein:

the advancement of funds is made prior to the funds being received by the internal cash account of the second financial institution from the first financial institution, the first account of the first financial institution stored on the one or more server machines of the partner bank, the FSP cash account stored on the one or more server machines of the partner bank, and the second account of the second financial institution stored on the one or more server machines of the partner bank; and the advancement of funds from the internal cash account of the second financial institution to the recipient account is made in real-time relative to receiving the instant fund transfer request from the first computing device of the first user; and subsequent to the causing the third server machine to advance the funds, providing fund transfer completion information to the second bidirectional API based on the chaining, wherein the fund transfer completion information indicates that the instant fund transfer request has been fulfilled.

16. The non-transitory machine-readable medium of claim 15, wherein the operations further comprise:
configuring one or more of the first bidirectional API or the second bidirectional API according to an ISO 20022 standard.

17. The non-transitory machine-readable medium of claim 15, wherein the instant fund transfer request does not redirect the first user to a different website in the second browser application running on the first computing device.

18. The non-transitory machine-readable medium of claim 15, wherein the second bidirectional API is used in providing the fund transfer completion information to the second user at an online site of the second financial institution without redirecting the second user away from the online site.

19. The non-transitory machine-readable medium of claim 15, wherein the first account and the second account are maintained based on "due to-due from" accounting.

20. The non-transitory machine-readable medium of claim 15, wherein the chaining causes sequential invocations of the first bidirectional API and the second bidirectional API.

* * * * *